(12) United States Patent
Hong et al.

(10) Patent No.: US 6,640,647 B1
(45) Date of Patent: Nov. 4, 2003

(54) SYSTEM FOR STRUCTURAL STRAIN SENSING BY OPTICAL FIBER SENSOR

(75) Inventors: Chang-Sun Hong, Seoul (KR);
Chun-Gon Kim, Taejon (KR);
Chi-Young Ryu, Taejon (KR);
Joong-Wan Park, Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 6 days.

(21) Appl. No.: 10/048,891

(22) PCT Filed: Aug. 3, 2000

(86) PCT No.: PCT/KR00/00855

§ 371 (c)(1),
(2), (4) Date: Apr. 25, 2002

(87) PCT Pub. No.: WO01/09565

PCT Pub. Date: Feb. 8, 2001

(30) Foreign Application Priority Data

Aug. 3, 1999 (KR) .......................................... 1999-31782

(51) Int. Cl.[7] ................................................. G01L 1/24
(52) U.S. Cl. ..................... 73/800; 250/227.27; 356/478
(58) Field of Search ........................ 73/800; 250/227.27, 250/227.14, 227.23, 227.18; 356/478, 477

(56) References Cited

U.S. PATENT DOCUMENTS

| | | | | | |
|---|---|---|---|---|---|
| 4,996,419 | A | * | 2/1991 | Morey | 250/227.18 |
| 5,218,419 | A | * | 6/1993 | Lipson et al. | 356/477 |
| 5,227,857 | A | * | 7/1993 | Kersey | 356/477 |
| 5,410,404 | A | * | 4/1995 | Kersey et al. | 356/478 |

* cited by examiner

*Primary Examiner*—Edward Lefkowitz
*Assistant Examiner*—Jewel V. Thompson
(74) *Attorney, Agent, or Firm*—Dann, Dorfman, Herrell and Skillman; Henry H. Skillman

(57) ABSTRACT

Disclosed is a fiber optic sensor system for sensing strain of the structure by using a wavelength swept fiber laser as a light source and using a fiber Bragg grating sensor as a fiber optic sensor, comprising: a reference fiber Bragg grating sensor, a fiber Bragg grating sensor array being branched from the reference fiber Bragg grating sensor through a coupler; a strain rate measuring coordinate signal-outputting means adapted to output an optical signal having a certain wavelength, an optical detector being connected to the coupler from which the fiber Bragg grating sensor group and the strain measuring coordinate signal-outputting means are branched for detecting output signals generated from the strain measuring coordinate signal-outputting means.

2 Claims, 5 Drawing Sheets

SYSTEM FOR STRUCTURAL STRAIN SENSING BY OPTICAL FIBER SENSOR

TECHNICAL FIELD

The present invention relates to a sensor system for sensing a security or a breakage of large structures such as a bridge, a building, or an atomic power plant, and the like, more particularly, to a fiber optic sensor system for sensing strain of the structures which allows the strain of the structures to be sensed precisely in real time during the entire time of operation of the structure by using a wavelength swept fiber laser (often, referred to as "WSFL") as a light source and using a fiber Brag grating (often, referred to as "FBG") sensor as a fiber optic sensor (FOS).

BACKGROUND ART

Currently, there have been many researches on the applications of using fiber optic sensors in smart composite structures that are composite structures combined with sensors. In this regard, unlike a conventional security inspection method for large structures, a security diagnosis technology has been developed which enables a security or a breakage of the smart composite structures to be sensed precisely in real time for during the entire time of operation of the structures. This technology using fiber optic sensor contributes to prevention from a ruin of the structures such as a bridge or an atomic power plant which may suffer great damage upon the breakage of the structures, and reduction in a cost incurred due to maintenance and repair of the structures.

The smart composite structures are composed of a sensor system, a brain system, and actuating system. The sensor system is adapted to sense the change of an external environment. The brain system is adapted to process the sensed information, and includes a microprocessor having a signal processor and database for characteristics of the structures installed therein. The actuating system is adapted to actively cope with the sensed change of the external environment, and comprises a piezoelectric ceramic, ER/MR fluid, or a Shaped Memory Alloy (SMA).

In the meantime, the sensing system may comprise a semiconductor sensor, a metallic thin film sensor, a piezoelectric sensor, or a fiber optic sensor, etc. In the case of constructing the sensing system by using the fiber optic sensor, it has several advantages in that it is not affected by the electric magnetic field, is very extensive in the range of an operating temperature, and has an extremely small diameter. In addition, the fiber optic sensor is flexible, so it is possible to easily construct a sensor having a size that a user wants. Further, the fiber optic sensor can provide a high resolution and transmit a large quantity of information. As a result, its application range is being extended increasingly.

The fiber optic sensor can be classified into an amplitude sensor, a polarization sensor, and an interferometic sensor according to a sensing principle. More specifically, the fiber optic sensor comprises a sensor implemented by a method which utilizes information on whether or not light can be transmitted due to breakage of an optical fiber's end, a sensor implemented by a method utilizing polarization of light, and a sensor implemented by a method utilizing interference of light such as Mach Zender, Michelson, and Fabry-Perot interferometer fiber optic sensors. Among these sensors, the interferometer fiber optic sensor using interference of light, which is most widely used to measure the strain or composite structures, is also adapted to measure strain behavior from an interference signal due to a difference between light paths caused by a strain of structures. However, such interferometic fiber optic sensors is not efficient for the application of a multiplexing used to measure many points simultaneously, and involves many problems in the process of processing an output signal from the sensors. Therefore, in these days, FBG sensors have been developed newly and are now used which are able to simply measure disturbances such as strain behavior and temperature by measuring a variation in a reflection wavelength.

The FBG sensors are formed in such a fashion to provide regions where an index of refraction is changed in a core of an optical fiber, i.e., Bragg gratings are formed in the fiber optic core at predetermined, spaced apart intervals. At this point, wavelength components that are determined based on an effective index of refraction of the FBG and the interval between the gratings are reflected from each of the FBG, and the remaining wavelength components are transmitted. Therefore, if disturbances such as strain, and the like are applied to the FBG, the wavelength of the reflected light varies, and it is possible to measure strain behavior of the structures through a measure of an amount of the changes in the wavelength of the light reflected by the respective Bragg Gratings. Further, if the Bragg Gratings are configured such that they are not overlapped from each other even when the Bragg Gratings are subjected to strain by virtue of making a center wavelength of the light reflected by the Bragg Gratings different, it is possible to inscribe a plurality of FBG sensors into a length of optical fiber, and hence a simultaneous multi-point detection technique of strain can be easily implemented. Also, it is possible to measure an absolute amount of strain where strain is distinct from compression, and since an output signal is associated with only the wavelength of light, a fiber optic sensor system can be implemented easily irrespective of a change in the intensity of light. In addition, since the output signal is linear with respect to strain, the FBG sensors maintain nearly the intensity of an optical fiber itself, so an intensity characteristic is good.

There are well known conventional methods for demodulating a signal outputted from FBG sensors having such advantages. That is, either a Michelson interferometer or a Mach Zender interferometer is configured as a demodulator for demodulating the signal outputted from FBG sensors, or a fiber Fabry-Perot filter is used as the demodulator. However, for such a demodulator system configured with either the Michelson interferometer or the Mach Zender interferometer, there is no an absolute reference of the demodulator system, and a minute difference in an optical path is required, so the demodulator system is significantly difficult to fabricate. Furthermore, the most disadvantage of the demodulator system is that if a multiplexing method of inscribing a plurality of FBG sensors into a length of optical fiber is employed, a considerably complex signal processing process becomes necessary. Also, in case of such a demodulator system using the fiber Fabry-Perot filter as a demodulator, the multiplexing method is possible, but since a resolution is determined by a bandwidth of the fiber Fabry-Perot filter, a resolution of the system is deteriorated. Thus, in order to improve the resolution, a high-priced fiber Fabry-Perot filter having a narrow bandwidth is necessary, which results in an increase of a cost. To resolve this problem, there has been developed and is used a fiber optic sensor system using, as a light source, a Wavelength Swept Fiber Laser (hereinafter, interchangeably referred to as either "WSFL" or "Wavelength Swept Fiber Laser") which does not require a separate demodulator system since a light source itself outputs information about a wavelength such that the information is associated with a time region. Such a system has an advantage in that it has a high output power of light and a good resolution. However, in case of this system, a non-linearity may be exhibited in the system due to a non-linearity of the fiber Fabry-Perot filter, and there may occur an error when measuring strain on a structure.

DISCLOSURE OF THE INVENTION

Therefore, the present invention has been made in view of the above-mentioned problems and to resolve several problems which may be occurred when measuring strain on a structure due to a non-linearity of the FBG sensor system using a WSFL as a light source, and it is an object of the present invention to provide a fiber optic sensor system for sensing strain of a structure by which a Fabry-Perot etalon is added to a conventional FBG sensor system so that a coordinate is set with an output signal of light reflected from the Fabry-Perot etalon at a wavelength region to correct the non-linearity of the FBG sensor system, thereby allowing an abnormal state of the structure to be sensed without an error in real time.

According to one aspect of the present invention, there is provided a fiber optic sensor system for sensing strain of structures by using a WSFL as a light source and using a FBG sensor as a Fiber Optic Sensor, comprising:

a reference FBG sensor installed within the structure so that it is not subject to strain, the reference Fiber Bragg Grating sensor functioning as a reference for referring to information on a wavelength;

a Fiber Bragg Grating sensor array including at least one Fiber Bragg Grating sensor embedded in the structure for sensing the strain of the structure, the Fiber Bragg Grating sensor array being branched from the reference Fiber Bragg Grating sensor by a coupler;

a strain rate measuring coordinate signal-outputting means branched from a Fiber Bragg Grating sensor group consisting of the reference Fiber Bragg Grating sensor and the Fiber Bragg Grating sensor array through a coupler, the strain rate measuring coordinate signal-outputting means adapted to output an optical signal having a uniform wavelength; and an optical detector for detecting output signals of the optic fiber Bragg sensor group and the strain rate measuring coordinate signal-outputting means.

BRIEF DESCRIPTION OF THE DRAWINGS

The above object, other features and advantages of the present invention will become more apparent by describing the preferred embodiment thereof with reference to the accompanying drawings, in which.

BEST MODE FOR CARRYING OUT THE INVENTION

Reference will now be described in detail with reference to the preferred embodiments of the present invention.

Figure 1:
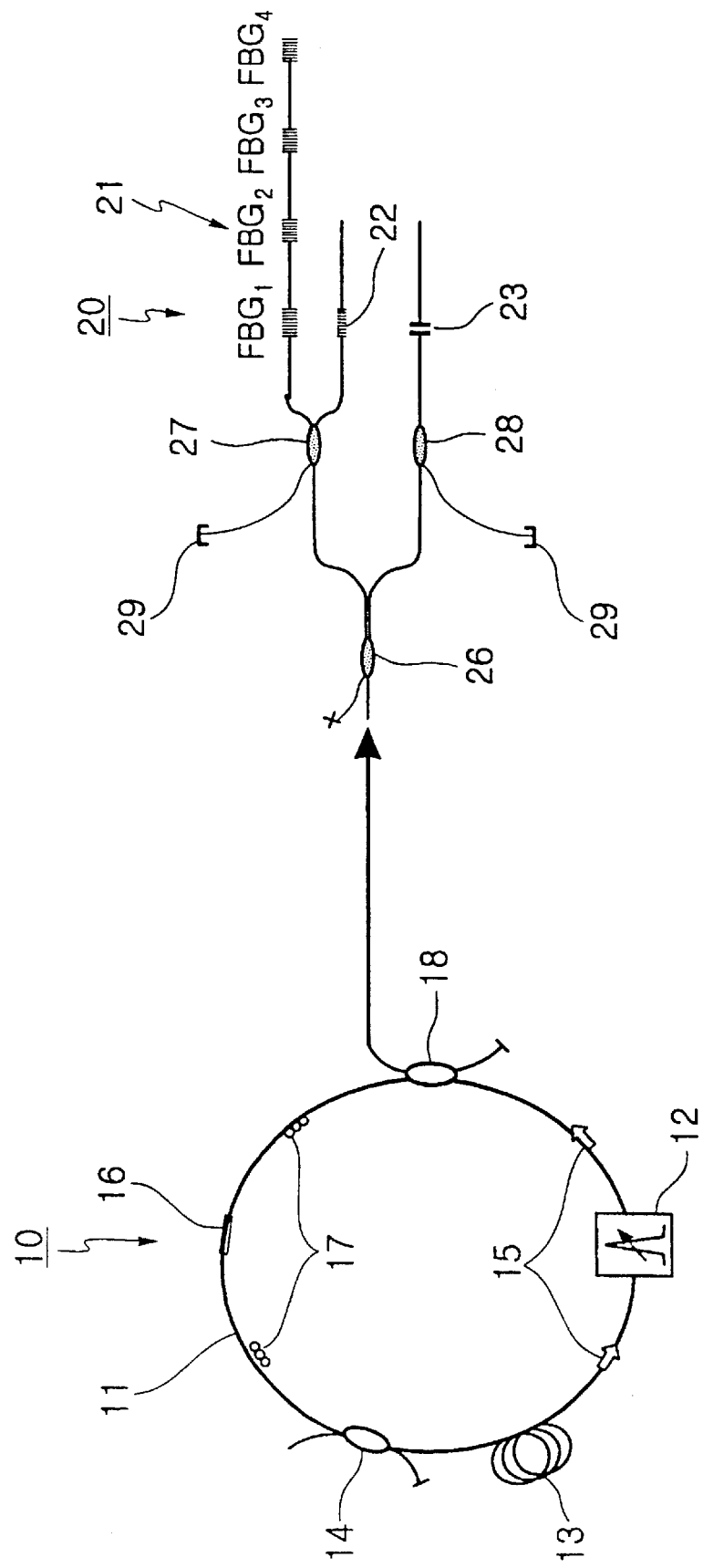
FIG. 1 is a block view illustrating a fiber optic sensor system for sensing strain of structures according to the present invention.

FIG. 1 is a block view illustrating a fiber optic sensor system for sensing strain of structures according to the present invention.

Referring to FIG. 1, the fiber optic sensor system for sensing strain of structures comprises a WSFL 10 adapted to be used as a light source and a sensor section 20 adapted to be used as a fiber optic sensor.

As well known, the WSFL 10 is composed of a ring resonator 11 having a Febry-Perot filter 12 included therein to obtain a gain of an output wavelength from the WSFL 10. The WSFL 10 is configured with a unidirectional ring shape so that light proceeds only in one direction, and employs an erbium Doped Fiber 13 as a gain medium for amplifying light to obtain a broadband source and a pump laser 14 as a pump source for exciting the gain medium.

The Fabry-Perot filter 12 is used as a scanning filter. In order to obtain a laser output power at a band surrounding defined wavelength, a triangle waveform voltage modulation signal is applied to the Fabry-Perot filter 12, and a pair of isolators are disposed at the front side and the rear side of the Fabry-Perot filter 12 so that light is not directed to a direction opposite to the processing direction of light by a reflection of light within the ring resonator 11. Also, the ring resonator 11 comprises a polarizer 16 for removing one polarizing shaft, and a polarized light adjuster 17 for adjusting a polarizing shaft is disposed at the front side and the rear side of the polarizer 16.

In the meantime, the sensor section 20 comprises a Fiber Bragg Grating sensor array 21 embedded into or attached to a practical structure for measuring strain thereof, a reference Fiber Bragg Grating sensor 22 established to the structure so that it is not subjected to strain for functioning as a reference for referring to information on a wavelength, and a Fabry-Perot etalon 23 adapted to output an optical signal having a uniform wavelength by adjusting microscopically an air gap formed therein through the use of a glass capillary tube or an optical fiber.

Figure 2:
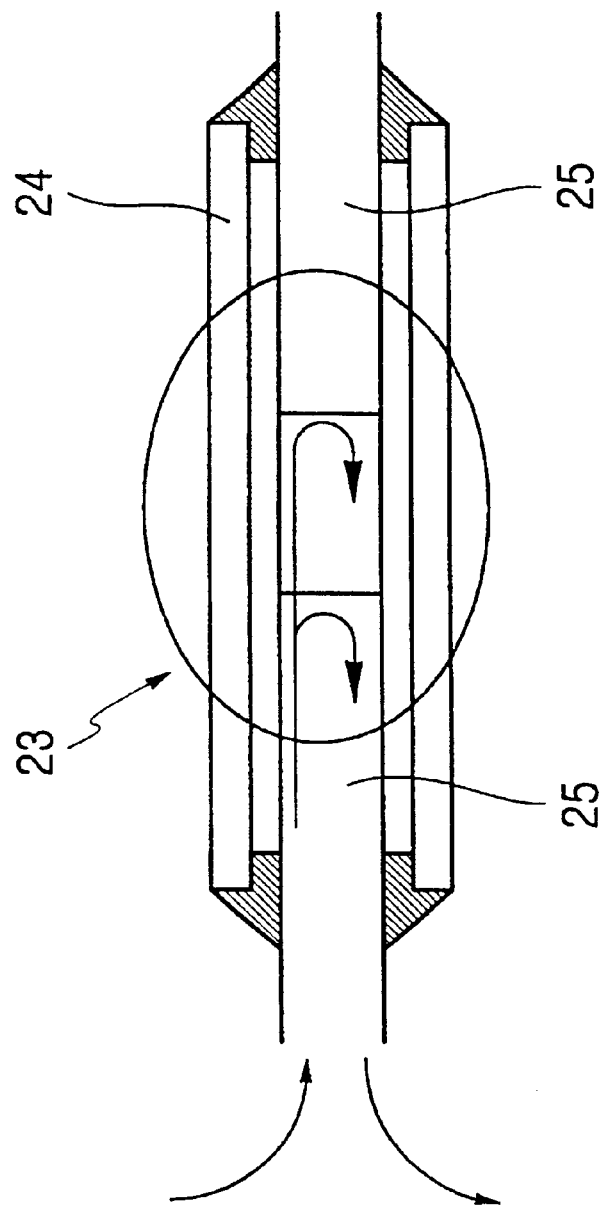
FIG. 2 is a schematic diagram illustrating a Fabry-Perot etalon according to the present invention.

FIG. 2 is a schematic diagram illustrating a Fabry-Perot etalon according to the present invention.

As shown in FIG. 2, the Fabry-Perot etalon 23 is configured so that optical fibers 25 are spaced apart at a predetermined interval from each other within the glass capillary tube 24. At this time, the end surfaces of the optical fibers 25 acts as mirrors, and hence, light having a uniform wavelength is outputted by virtue of a multi-interference which allows light to be reflected continuously from the end surfaces of the optical fibers 25 at the gap between the end surfaces thereof. As will be described later, such an output signal from the Fabry-Perot etalon 23 is used as a criterion at a wavelength band in measuring strain producing a wavelength shift in the light reflected by the FBG sensor.

The FBG sensor array 21 and the reference FBG sensor 22 each for sensing strain of the structure are branched from a coupler 27. Also, the FBG sensor group consisting of the FBG sensor array 21 and the reference FBG sensor 22, and the Fabry-Perot etalon 23 are branched through a coupler 26.

The light reflected by the FBG sensor array 21 and the reference FBG sensor 22 is obtained by an optical detector 29a connected to the coupler 27, and the light reflected by the Fabry-Perot etalon 23 is obtained by another optical detector 29b connected to the coupler 28. Like this, the aim of using different optical detectors is to prevent distortion of the output signal from the Fabry-Perot etalon 23 used as a criterion at a wavelength band in measuring strain producing a wavelength shift in the light reflected by the FBG sensor when the light reflected by the FBG sensor is overlapped with the light reflected by the Fabry-Perot etalon 23.

Reference numerals 18 and 28 denote couplers.

The operation of the fiber optic sensor system for sensing strain of a structure constructed like this will be described in detail hereinafter with reference to the accompanying drawings and a concrete embodiment.

Figure 3:
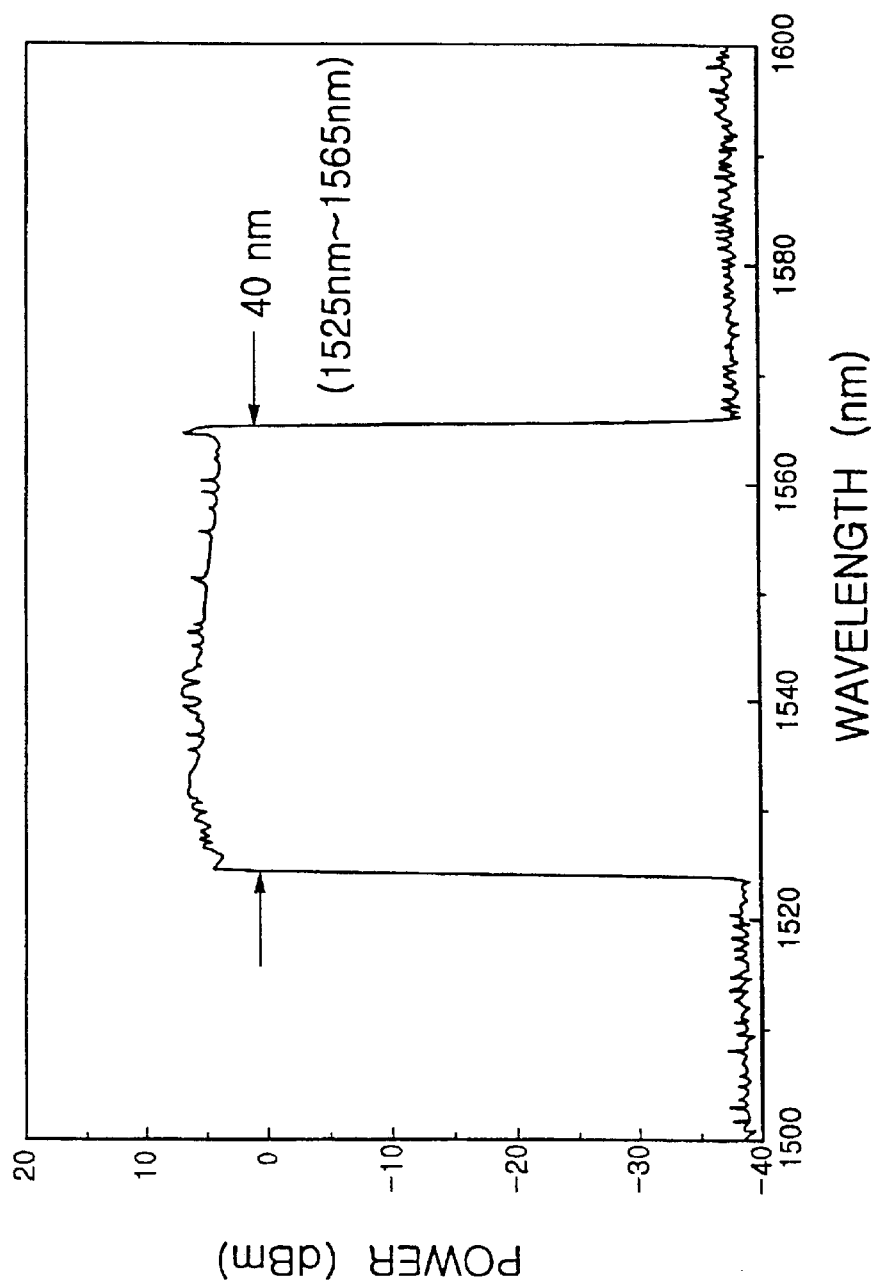
FIG. 3 is a graph illustrating an output signal from a WSFL according to the present invention.

As mentioned above, in the wavelength swept fiber laser as a light source applied to the present invention, since all the light powers are outputted at a narrow band of wavelength, the WSFL 10 has a very high output signal power while having a high resolution. In addition, a triangle waveform signal of 130 Hz as a modulating signal is applied to the Fabry-Perot filter 12, and the erbium doped fiber (EDF) 13 having a length of 30 m is used as a gain medium for amplifying light to obtain a broadband source and a pump laser 14 having a wavelength of 980 nm is used as a pump source for exciting the gain medium. Accordingly, an optical signal whose center wavelength is near a wavelength band of 1550 nm and whose bandwidth is between 1525 nm and 1565 nm, as shown in FIG. 3, is outputted.

The optical signal generated from the wavelength swept fiber laser 10 is branched from the 50:50 coupler 26, and hence, one half of the light of the optical signal enters an FBG sensor side consisting of the FBG sensor array 21 and the reference FBG sensor and the other half thereof enters the Fabry-Perot etalon 23 side.

The optical signal is divided in half through the 50:50 coupler 26 and each half respectively enters the FBG sensor side and the Fabry-Perot etalon 23 side, and each is converted into a voltage signal by the optical detectors 29a and 29b.

Figure 4:
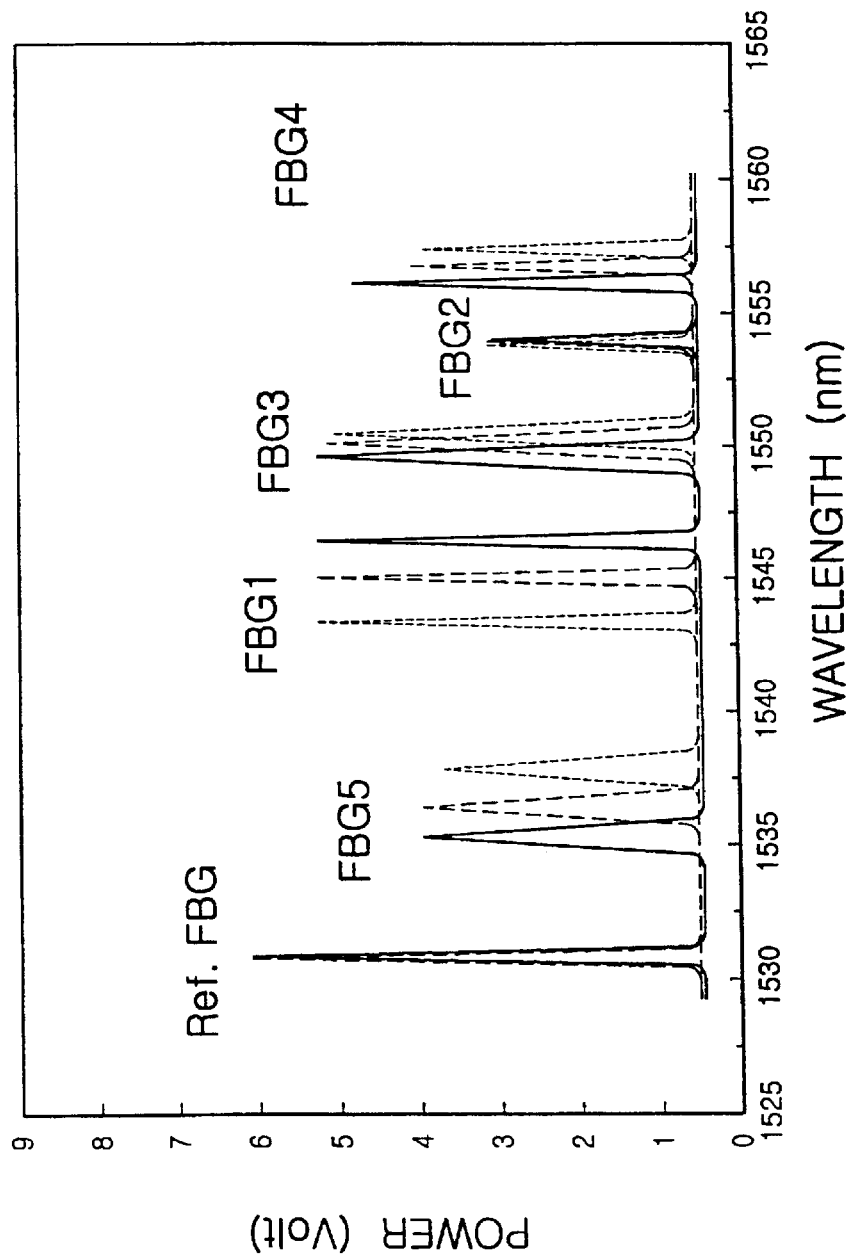
FIG. 4 is a graph illustrating output signals from a reference Fiber Bragg Grating sensor and each of a plurality of Fiber Bragg Grating sensors according to the present invention.

FIG. 4 is a graph illustrating the relationship between each output signal from a reference FBG sensor and a plurality of FBG sensors and its corresponding wavelength in the case of configuring a reference fiber Bragg grating sensor whose center wavelength is 1532 nm and a FBG sensor array.

It can be understood from FIG. 4 that dotted lines indicates how the center wavelength of the light reflected by each of the FBG sensors has shifted from nominal center by virtue of strain on a structure and hence the respective FBG sensors must be distributed appropriately in consideration of strain so that the wavelengths of light reflected by the respective FBG sensors are not overlapped with each other in a band of wavelength as the respective FBG sensors experience strain.

Figure 5:
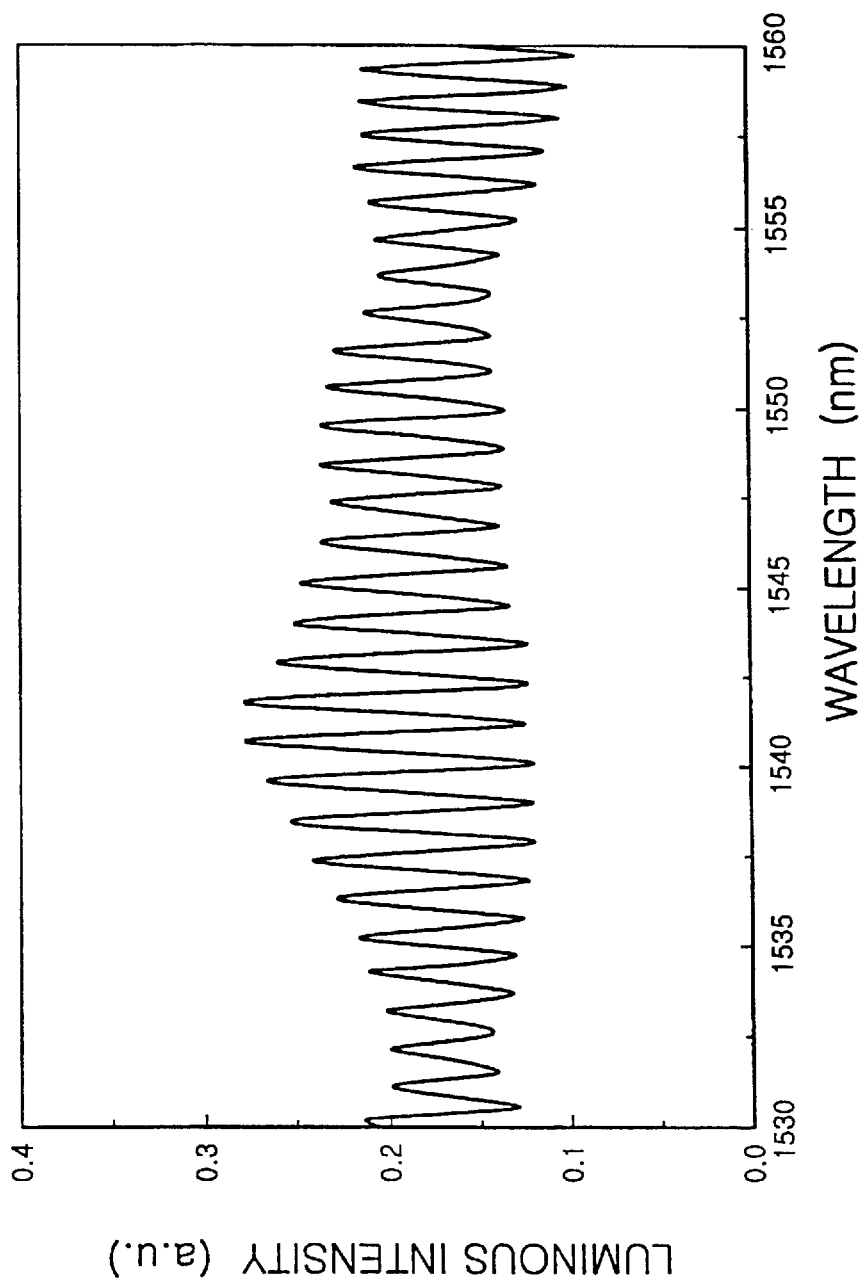
FIG. 5 is a graph illustrating an output signal from the Fabry-Perot etalon according to the present invention.

Meanwhile, the Fabry-Perot etalon 23 adjusts the gap between two optical fibers to output an optical signal the spacing between valleys of the wavelength of which is divided equally by 1 nm precisely within the band range of wavelength of 1530–1560 m, (FIG. 5). Such characteristics of an output signal from the Fabry-Perot, etalon 23 is used as a criterion at a wavelength band in measuring a center wavelength shift in the light reflected by each FBC sensor of the FBG sensor array 21. That is, the output signal from the Fabry-Perot etalon 23 is used as a coordinate system for the center wavelength of each of the respective FBG sensors of the FBG sensor array 21 by using the center wavelength of the reference FBG sensor 22 as a reference. Further, actual strain on the structure can be calculated precisely without the modulating voltage applied to the Fabry-Perot filter 12 disposed within the wavelength swept fiber laser 10 being not affected by a non-linearity, by measuring a change in position of the center wavelength of the light reflected by each of the FBG sensors shifted by virtue of actual deformation acting on a structure on the basis of a position of each of the initial FBG sensors not subjected to strain set in the coordinate system.

EFFECT OF THE INVENTION

As can be seen from the foregoing, the fiber optic sensor system for sensing strain of a structure of the present invention ensures prevention of an error in measuring strain on a structure which may occur due to non-linearity of the FBG sensor system employing the wavelength swept fiber laser as a light source by using an output signal from the Fabry-Perot etalon as a criterion at a wavelength band in measuring a center wavelength shift in the light reflected by each FBG sensor of the FBG sensor array. Accordingly, users can implement effectively a sensor system for sensing deformation of structure by which a multiplexing technique is implemented easily and which has a high resolution.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A system for sensing strain of an optic fiber structure which uses a wavelength swept fiber laser as a light source and uses a fiber Bragg grating sensor as fiber optic sensor, the system comprising:

a reference optic fiber Bragg grating sensor installed without subjecting to strain;

a fiber Bragg grating sensor array established at the optic fiber structure and including at least one fiber Bragg grating sensor for sensing a strain of the optic fiber structure, wherein the optic fiber Bragg grating sensor is branched from the reference optic fiber Bragg grating sensor by a first coupler;

a strain rate measuring coordinate signal-outputting means branched from an fiber Bragg grating sensor group comprising the reference optic fiber Bragg grating sensor and the optic fiber Bragg grating sensor array for outputting an optical signal having a certain wavelength; and an optical detector for detecting output signals of the optic fiber Bragg grating sensor group and the strain rate measuring coordinate signal-outputting means.

2. The system of claim 1, wherein the strain rate measuring coordinate signal-outputting means is a Fabry-Perot etalon that outputs an optical signal having a constant interval between ravines within a selected wavelength range by multi-interference of light beams.

* * * * *

UNITED STATES PATENT AND TRADEMARK OFFICE
CERTIFICATE OF CORRECTION

PATENT NO.     : 6,640,647 B1                                               Page 1 of 1
DATED          : November 4, 2003
INVENTOR(S)    : Hong et al.

It is certified that error appears in the above-identified patent and that said Letters Patent is hereby corrected as shown below:

Column 1,
Line 67, "or" should be -- of --.

Signed and Sealed this

Thirtieth Day of December, 2003

JAMES E. ROGAN
*Director of the United States Patent and Trademark Office*